(12) United States Patent
Yeh

(10) Patent No.: US 11,713,085 B2
(45) Date of Patent: Aug. 1, 2023

(54) REAR CARGO BED STRUCTURE OF MULTIPURPOSE VEHICLE

(71) Applicant: KWANG YANG MOTOR CO., LTD., Kaohsiung (TW)

(72) Inventor: Kuei-Cheng Yeh, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 64 days.

(21) Appl. No.: 17/482,427

(22) Filed: Sep. 23, 2021

(65) Prior Publication Data

US 2022/0194491 A1  Jun. 23, 2022

(30) Foreign Application Priority Data

Dec. 23, 2020 (TW) .................................. 109217008

(51) Int. Cl.
| | | |
|---|---|---|
| *B62D 33/033* | (2006.01) | |
| *B60P 1/28* | (2006.01) | |
| *B60P 7/15* | (2006.01) | |
| *B62D 33/02* | (2006.01) | |
| *B62D 33/027* | (2006.01) | |
| *B60N 2/36* | (2006.01) | |
| *B62D 33/08* | (2006.01) | |
| *B60P 3/42* | (2006.01) | |

(52) U.S. Cl.
CPC ........... *B62D 33/0273* (2013.01); *B60N 2/36* (2013.01); *B60P 3/423* (2013.01); *B62D 33/033* (2013.01); *B62D 33/08* (2013.01); *B60P 1/28* (2013.01); *B60P 7/15* (2013.01); *B62D 33/02* (2013.01)

(58) Field of Classification Search
CPC ...... B60R 9/06; B60P 1/28; B60P 7/15; B60P 3/423; B62D 33/02; B62D 33/0207; B62D 33/023; B62D 33/0273; B62D 33/08; B60N 2/36
See application file for complete search history.

(56) References Cited

U.S. PATENT DOCUMENTS

| | | | | |
|---|---|---|---|---|
| 4,964,768 | A * | 10/1990 | Shomo ...................... | B60P 7/15 410/151 |
| 9,731,775 | B1 * | 8/2017 | Tsumiyama ............ | B60R 9/065 |
| 10,214,151 | B1 * | 2/2019 | Lindsay ............... | A47B 13/003 |
| 2002/0018707 | A1 * | 2/2002 | Rodriguez Navio ........ | B62D 33/033 414/535 |
| 2002/0070255 | A1 * | 6/2002 | Hebert ...................... | B60R 9/06 224/526 |
| 2002/0148867 | A1 * | 10/2002 | Savant ...................... | B60R 9/06 224/558 |

(Continued)

*Primary Examiner* — Gregory A Blankenship
(74) *Attorney, Agent, or Firm* — Leong C. Lei

(57) ABSTRACT

A rear cargo bed structure of a multipurpose vehicle is provided. The multipurpose vehicle includes a vehicle frame unit, a steering device connected to the vehicle frame unit and operable to control a moving direction of the multipurpose vehicle, a front wheel assembly mounted to a front end of the vehicle frame unit, a seat portion mounted on the vehicle frame unit to receive a driver and a passenger to sit thereon, a rear wheel assembly mounted to a rear end of the vehicle frame unit, and a vehicle cover unit set on and covering a periphery of the vehicle frame unit. A rear cargo bed in the form of a flat surface is arranged on a rear frame portion of the vehicle frame unit. As such, the performance of the multipurpose vehicle for carrying cargo is improved.

14 Claims, 7 Drawing Sheets

(56) References Cited

U.S. PATENT DOCUMENTS

| | | | | |
|---|---|---|---|---|
| 2009/0115222 | A1* | 5/2009 | Hohnl | B60R 5/04 |
| | | | | 296/183.1 |
| 2009/0121518 | A1* | 5/2009 | Leonard | B62D 61/10 |
| | | | | 296/183.1 |
| 2015/0274060 | A1* | 10/2015 | Welch | B62D 25/2054 |
| | | | | 296/184.1 |
| 2016/0185398 | A1* | 6/2016 | Yamamoto | B60R 21/13 |
| | | | | 296/183.1 |
| 2018/0186270 | A1* | 7/2018 | Tsumiyama | B62D 33/02 |
| 2018/0186413 | A1* | 7/2018 | Tsumiyama | B60P 1/28 |
| 2018/0334199 | A1* | 11/2018 | Ueno | B60Q 1/30 |
| 2019/0135353 | A1* | 5/2019 | Hinz | B62D 33/0207 |
| 2021/0331580 | A1* | 10/2021 | Iwata | B60K 13/02 |
| 2022/0105994 | A1* | 4/2022 | Roberson | B62D 33/0207 |
| 2022/0194491 | A1* | 6/2022 | Yeh | B62D 33/08 |
| 2022/0355881 | A1* | 11/2022 | Sidwell | E02F 3/964 |
| 2022/0410781 | A1* | 12/2022 | Itou | B60P 1/28 |
| 2023/0001858 | A1* | 1/2023 | Greeno | B60R 9/06 |
| 2023/0001992 | A1* | 1/2023 | Guthard | B62D 53/08 |

* cited by examiner

REAR CARGO BED STRUCTURE OF MULTIPURPOSE VEHICLE

TECHNICAL FIELD OF THE INVENTION

The present invention relates to a rear cargo bed structure of a multipurpose vehicle, and more particularly to a multipurpose-vehicle rear cargo bed structure that enhances the performance of a multipurpose vehicle for carrying cargo.

DESCRIPTION OF THE PRIOR ART

As shown in FIG. 1, a multipurpose vehicle 1 is provided with a rear cargo bed 1 arranged rearwardly of a driving portion 112. The rear cargo bed 12 is defined by a rear side of the driving portion 11 and three relatively low sides of a vehicle body 13 and is opened in a top side of the vehicle body to form a cargo loading space. The rear cargo bed 12 enables a user to load thereon plants, hunting preys, or miscellaneous articles.

The above-described structure of the rear cargo bed 12 of the known multipurpose vehicle 1 provides a convenient measure for a user to carrying articles. However, the rear cargo bed 12 is defined by the rear side of the driving portion 11 and the three relatively low sides of the vehicle body 13, and consequently, the three relatively low sides of the vehicle body 13 may cause severe constraints to the cargo to be carried on the rear cargo bed 12.

Thus, it is a challenge of the multipurpose vehicle manufacturers to provide a rear cargo bed structure of a multipurpose vehicle that allows a user to easily load cargo on the rear cargo bed of the multipurpose vehicle without undesired constraints.

SUMMARY OF THE INVENTION

The primary objective of the present invention is to provide a rear cargo bed structure of a multipurpose vehicle, which helps overcomes the shortcoming that the rear cargo bed of the known multipurpose vehicle may impose severe constraints to loading of cargo thereon.

For such a purpose, the primary technical solution of the present invention is to provide a rear cargo bed structure of a multipurpose vehicle. The multipurpose vehicle comprises a vehicle frame unit, a steering device connected to the vehicle frame unit and operable to control a moving direction of the multipurpose vehicle, a front wheel assembly mounted to a front end of the vehicle frame unit, a seat portion mounted on the vehicle frame unit to receive a driver and a passenger to sit thereon, a rear wheel assembly mounted to a rear end of the vehicle frame unit, and a vehicle cover unit set on and covering a periphery of the vehicle frame unit. A rear cargo bed in the form of a flat surface is arranged on a rear frame portion of the vehicle frame unit.

The efficacy that the present invention may achieve with the primary technical solution thereof is that the performance of the multipurpose vehicle for carrying cargo is improved.

DETAILED DESCRIPTION OF THE PREFERRED EMBODIMENT

For better understanding of the structure of the present invention, and the efficacy that can be achieved, a description will be provided below with reference to the attached drawings.

Figure 1:
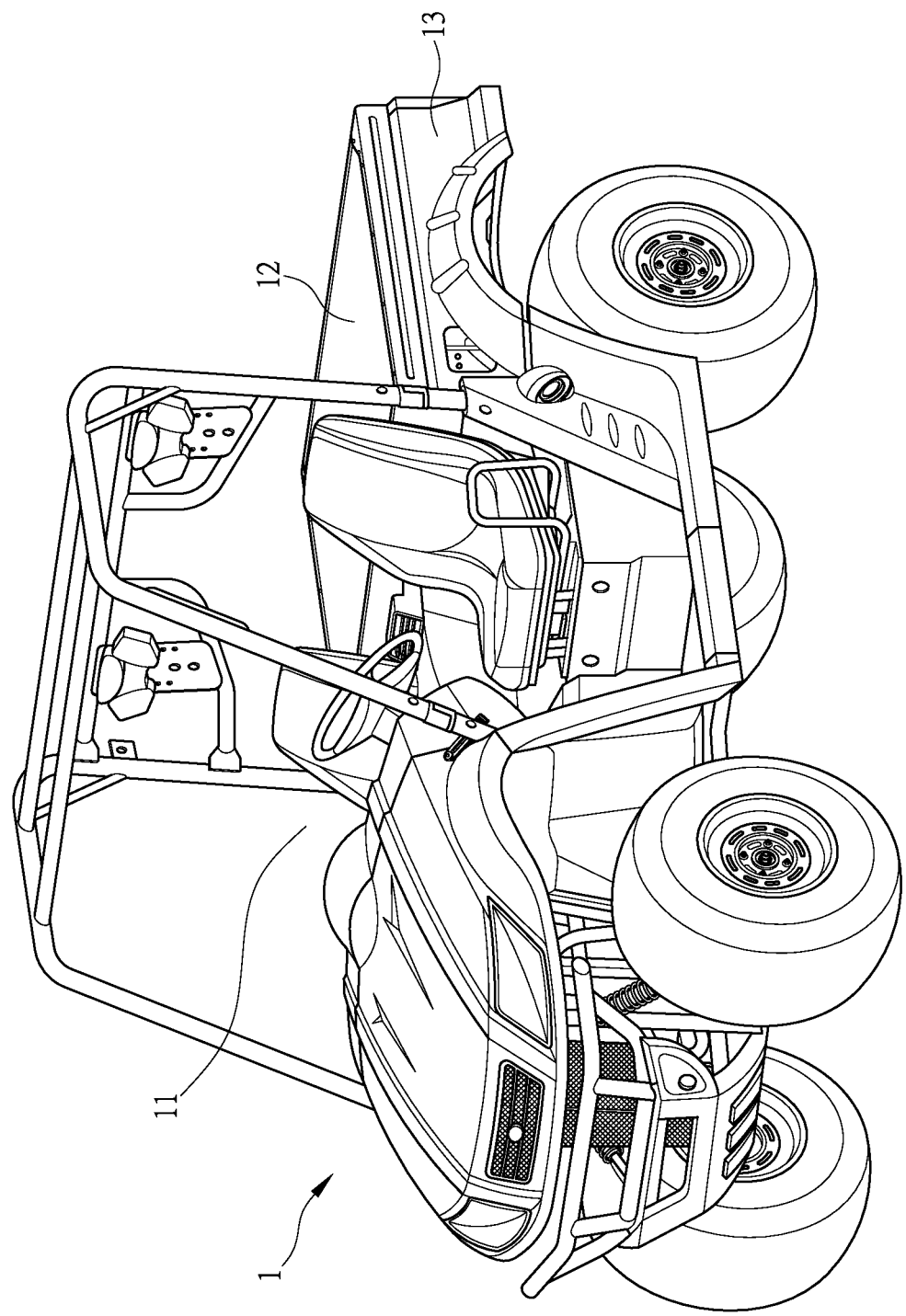
FIG. 1 is a perspective view showing an arrangement of a known multipurpose vehicle.
Figure 2:
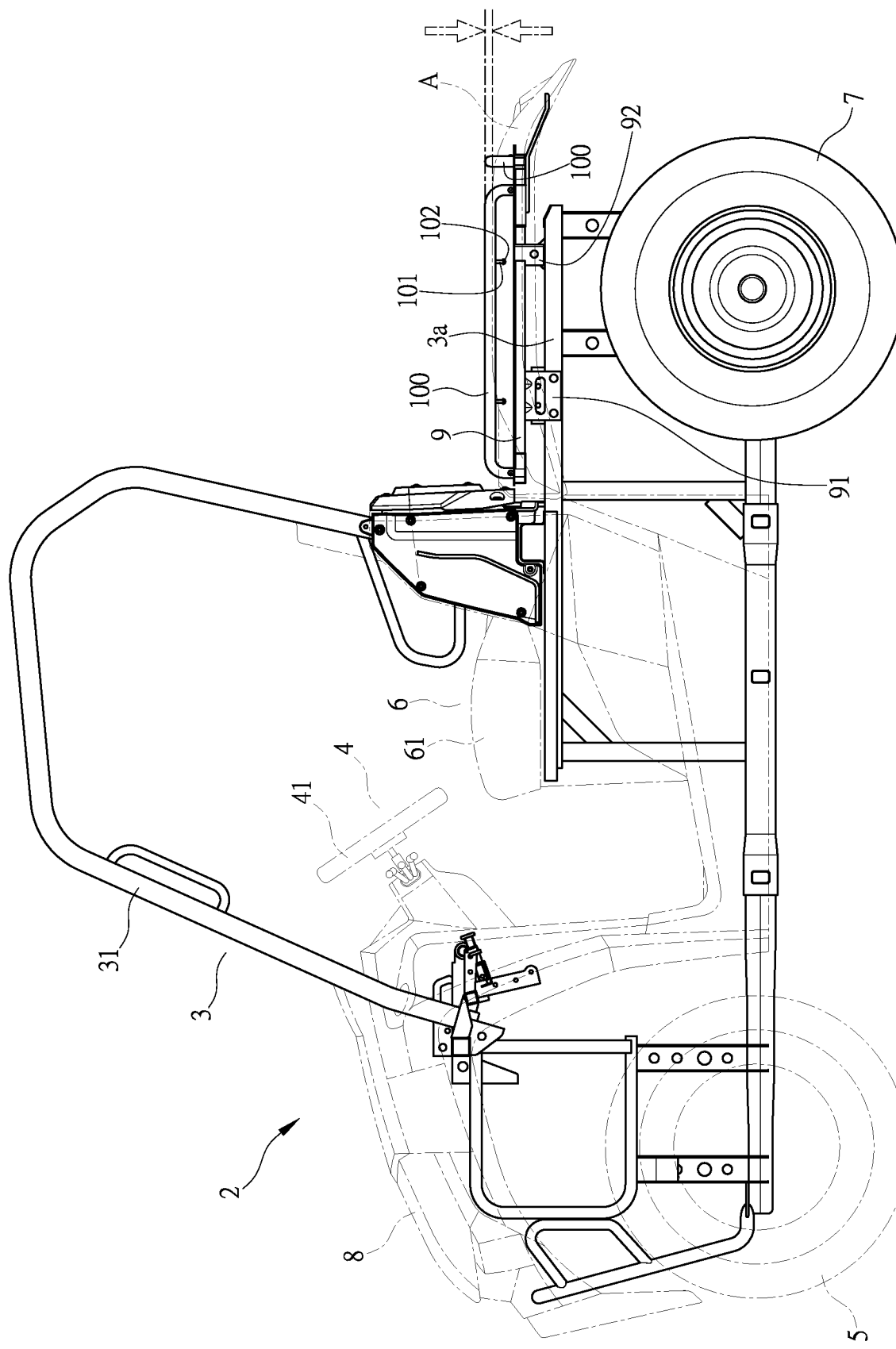
FIG. 2 is a side elevational view showing a multipurpose vehicle according to the present invention.
Figure 3:
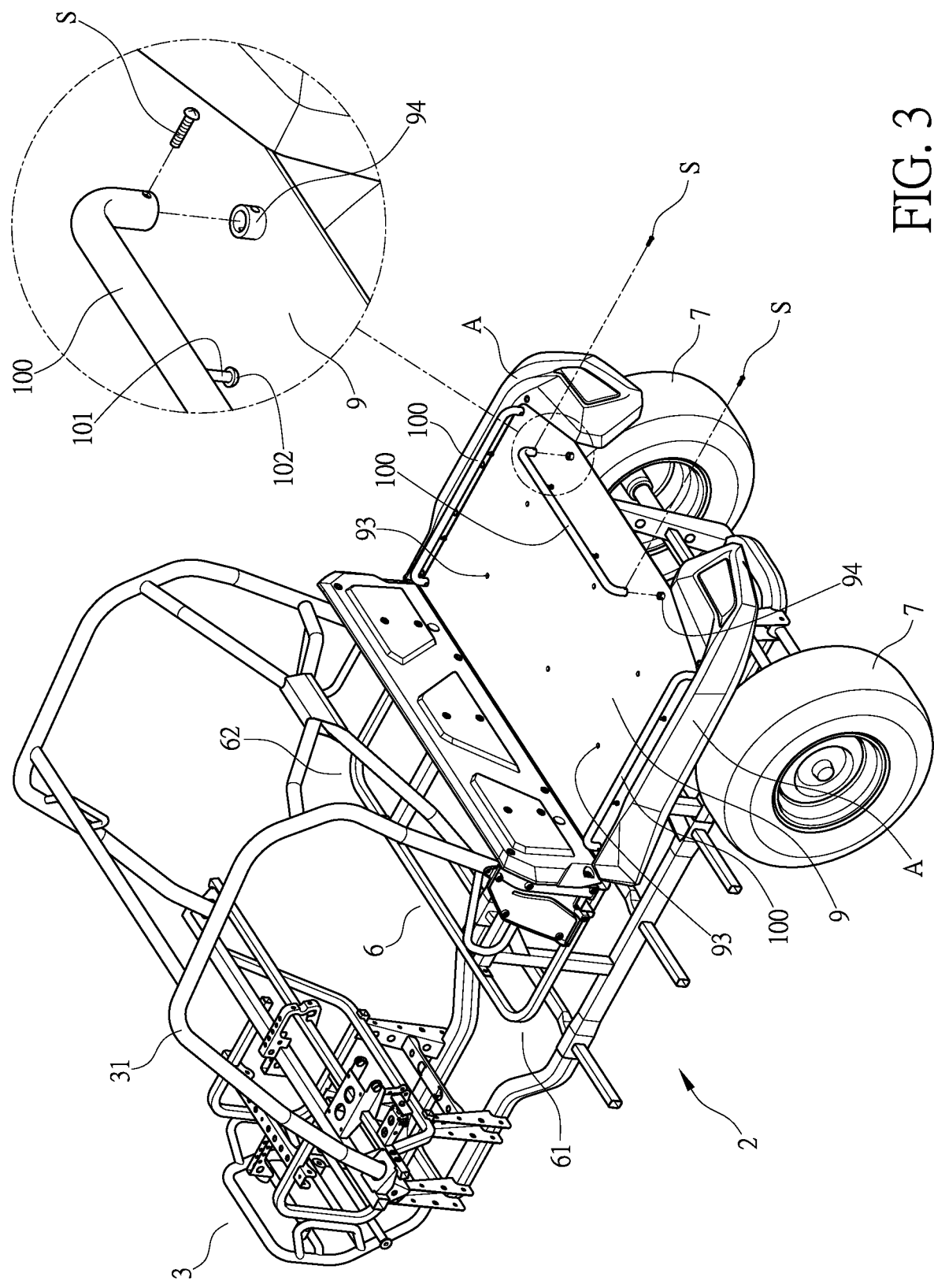
FIG. 3 is a perspective view showing a rear cargo bed of the multipurpose vehicle according to the present invention.

Firstly, referring to FIGS. 2 and 3, the present invention provides a rear cargo bed structure of a multipurpose vehicle. The multipurpose vehicle 2 comprises a vehicle frame unit 3, a steering device 4 connected to the vehicle frame unit 3 and operable to control a moving direction of the multipurpose vehicle 2, a front wheel assembly 5 mounted to a front end of the vehicle frame unit 3, a seat portion 6 mounted on the vehicle frame unit 3 to receive a driver and a passenger to sit thereon, a rear wheel assembly 7 mounted to a rear end of the vehicle frame unit 3, a vehicle cover unit 8 set on and covering a periphery of the vehicle frame unit 3, and a rear cargo bed 9 arranged on a rear side of the vehicle frame unit 3.

As shown in FIGS. 2 and 3, the vehicle frame unit 3 is further provided with a power unit (not shown in the drawings) that is mounted under the seat portion 6 to drive the multipurpose vehicle 2 to move and a roll cage 31 arranged above the seat portion 6. The power unit is operable to drive, by means of a transmission axle, the rear wheel assembly 7 to rotate so as to cause the multipurpose vehicle 2 to move forward or backward.

As shown in FIGS. 2 and 3, the steering device 4 comprises a steering wheel 41. The steering wheel 41 is operable to drive, by means of a steering column (not shown in the drawings), the front wheel assembly 5 to turn leftward or rightward, so as to achieve the purpose of turning the direction of the multipurpose vehicle 2.

As shown in FIGS. 2 and 3, the seat portion 6 comprises a driver seat 61 located rearward of the steering device 4 and a passenger seat 62 that is arranged for receiving a passenger to sit thereon and is located beside the driver seat 61.

As shown in FIGS. 2 and 3, the rear wheel assembly 7 is arranged under a rear part of the vehicle frame unit 3.

As shown in FIGS. 2 and 3, the vehicle cover unit 8 is set on and covers surfaces of a front part and left and right sides of the vehicle frame unit 3.

Figure 4:
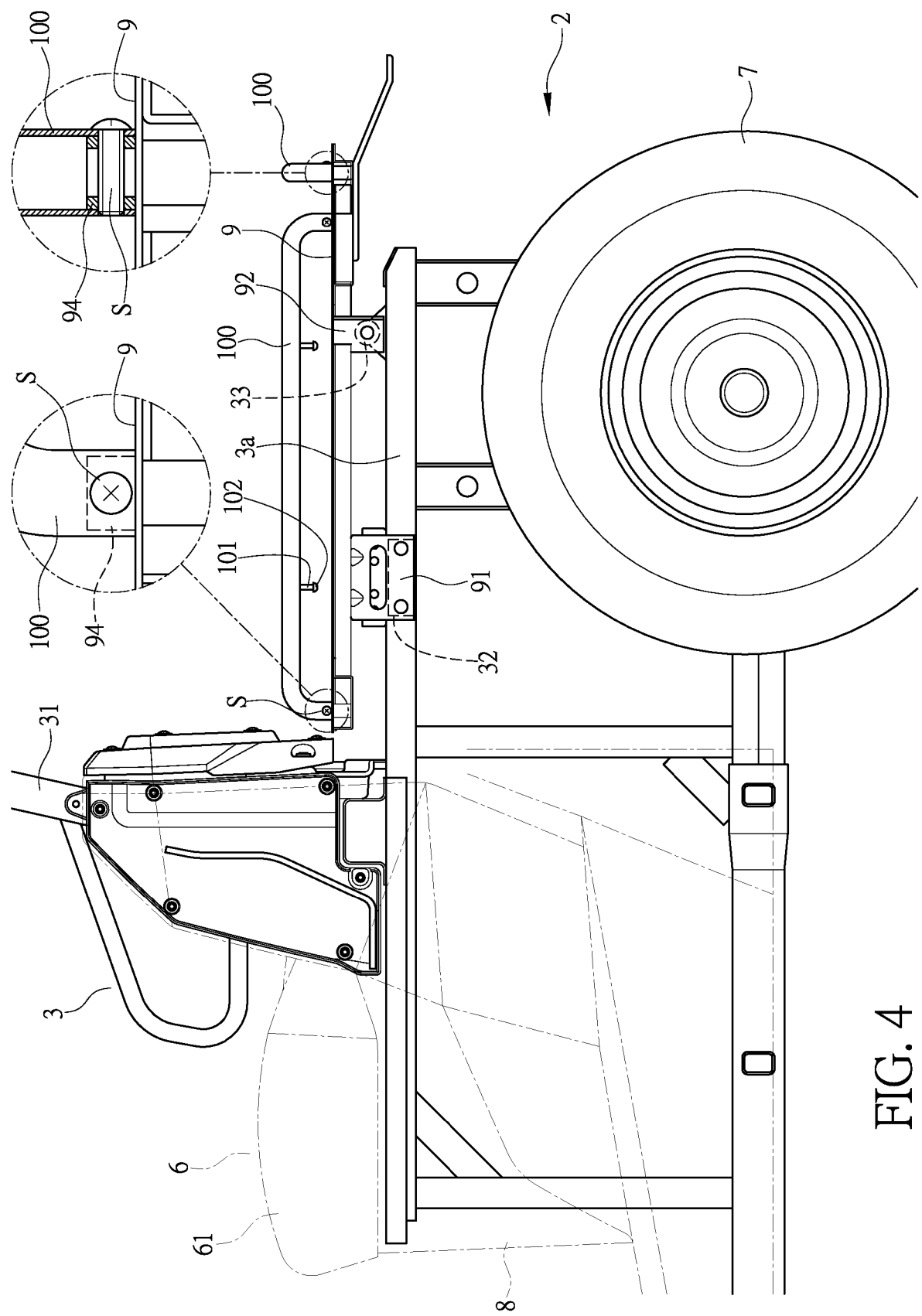
FIG. 4 is a schematic view showing connection between the rear cargo bed and a restraint bar of the multipurpose vehicle according to the present invention.

As shown in FIGS. 2, 3, and 4, the rear cargo bed 9 comprises a flat, planar plate. The rear cargo bed 9 is arranged on a rear frame portion 3a of the vehicle frame unit 3. Connection bases 32 that are arranged pairwise as a left-side one and a right-side one and pivot bases 33 that are arranged pairwise as a left-side one and a right-side one are arranged on the rear frame portion 3a of the vehicle frame unit 3 (only the left-side connection base 32 and the left-side pivot base 33 being visible in the drawings, the left side and right side respectively referring to the sides associated with the left and right hands of the driver in driving the vehicle). The rear cargo bed 9 is provided with fixing portions 91 to respectively correspond to the connection bases 32 of the vehicle frame unit 3, and the rear cargo bed 9 is provided with pivoting portions 92 to respectively correspond to the pivot bases 33 of the vehicle frame unit 3. The rear cargo bed 9 is pivotally connected to the pivot bases 33 of the vehicle frame unit 3 by means of the pivoting portions 92, and also, the rear cargo bed 9 is lockable to and mounted to the connection bases 32 of the vehicle frame unit 3 by means of the fixing portions 91, so that the rear cargo bed 9 is securely positioned on the rear frame portion 3a of the vehicle frame unit 3.

As shown in FIGS. 2, 3, and 4, the rear cargo bed 9 is provided with a plurality of connection fixing-holes 93 and is also provided, on each of three sides, namely a left side, a right side, and a rear side, thereof, with a pair of connection inserting-seats 94. The connection inserting-seats 94 may receive restraint bars 100 to fit thereto through insertion and fix in position by means of fastening elements S. The restraint bars 100 are each provided with a plurality of restrain pegs 101 projecting downward. The restrain pegs 101 each have an end that is expanded to form a restraining head portion 102. The restraint bars 100 are mounted, through insertion, to the rear cargo bed 9, and ropes may be used to wind and entangle around the restrain pegs 101 of the restraint bars 100 in order to achieve a bettered effect of securely restraining cargo on the rear cargo bed 9, and also, the restraining head portions 102 of the restrain pegs 101 would help prevent the restraining ropes from getting loosened. It is noted that the restraint bars 100 are mounted, through insertion, to the rear cargo bed 9, such that a top end surface of the restraint bars 100 is slightly higher than a top end of a rear vehicle body A surrounding three sides of the rear cargo bed 9, so that in case that the cargo loaded on and carried on the rear cargo bed 9 exceeds a width of the rear cargo bed 9, the restraint bars 100 may function to support the cargo thereon, preventing the cargo from pressing on the rear vehicle body A surrounding the three sides of the rear cargo bed 9.

Figure 5:
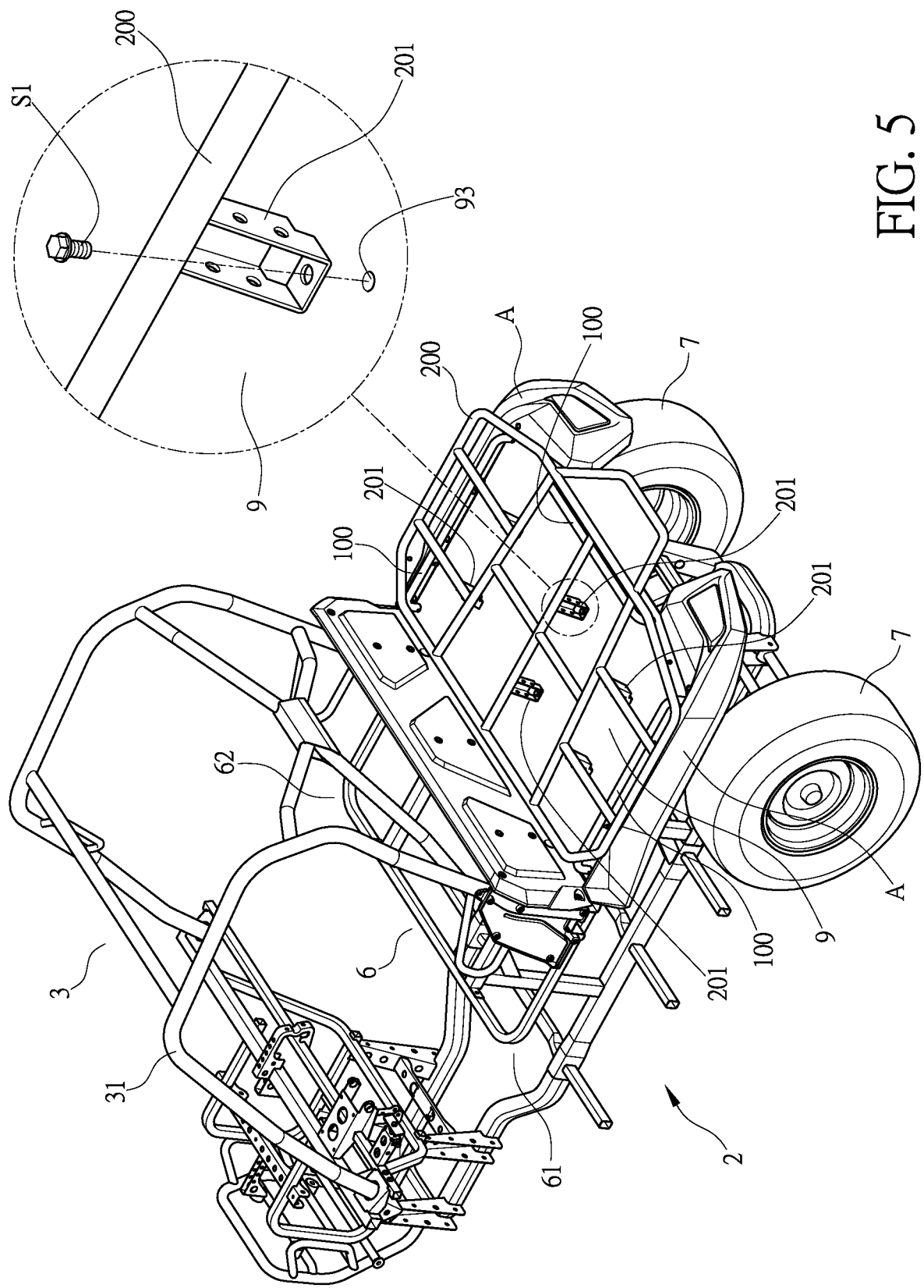
FIG. 5 shows another example of the rear cargo bed of the multipurpose vehicle according to the present invention.

As shown in FIGS. 2 and 5, to suit the needs of use, the rear cargo bed 9 may be further provided with a cargo rack 200 that is attachable to and mounted to the plurality of connection fixing-holes 93. The cargo rack 200 is provided with a plurality of connection mounting-bases 201 respectively corresponding to the plurality of connection fixing-holes 93 of the rear cargo bed 9, and fastening elements 51 may be applied to fasten the connection mounting-bases 201 to the connection fixing-holes 93, so that the cargo rack 200 can be securely positioned on the rear cargo bed 9, and the cargo rack 200 is kept away and spaced from the rear cargo bed 9 by a predetermined distance by means of length of the connection mounting-bases 201. Specifically, the spacing distance of the cargo rack 200 from the rear cargo bed 9 is determined by the length of the connection mounting-bases 201. The cargo rack 200 can be made of multiple steel rods connected in a grating form, so that cargo may be directly loaded thereon and restrained and secured in position by ropes.

Figure 6:
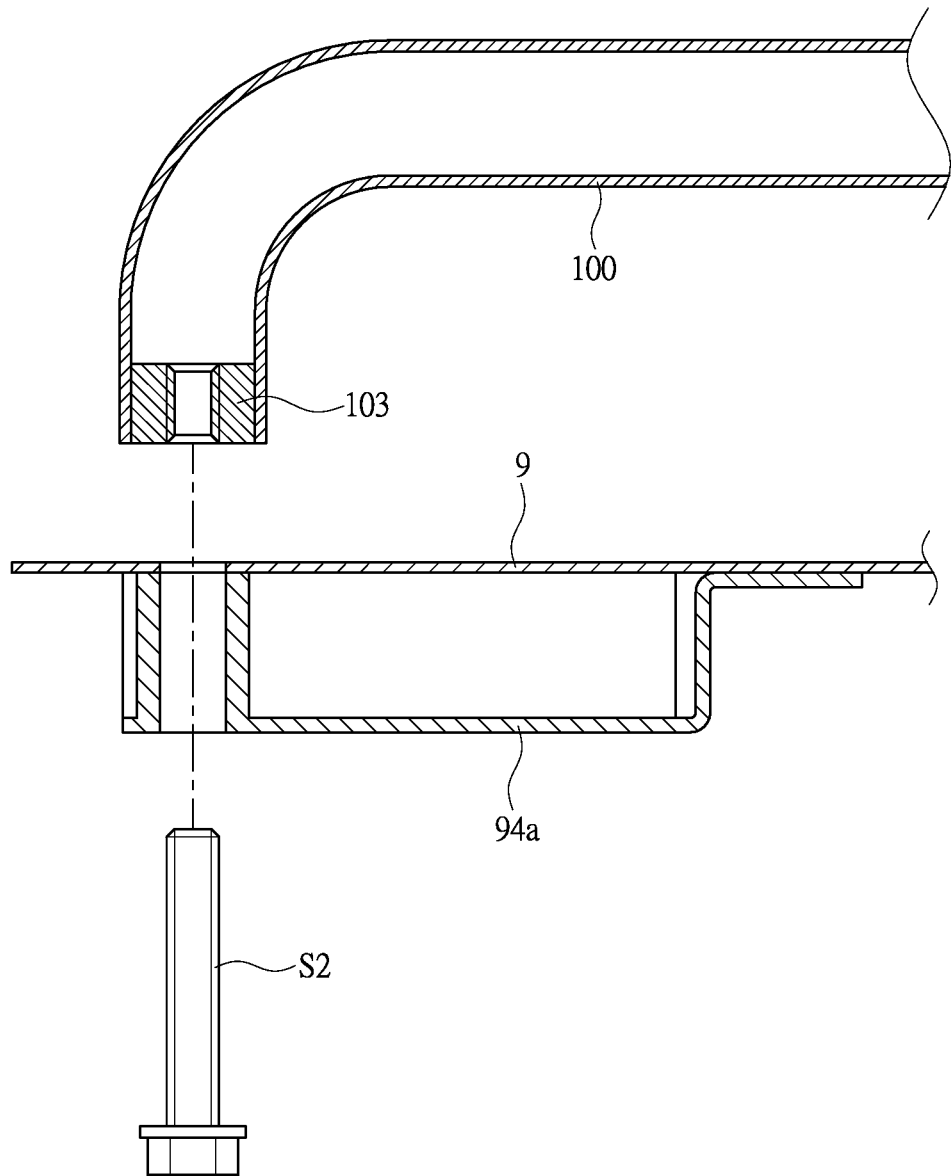
FIGS. 6 and 7 show another example of the connection between the rear cargo bed and the restraint bar according to the present invention.
Figure 7:
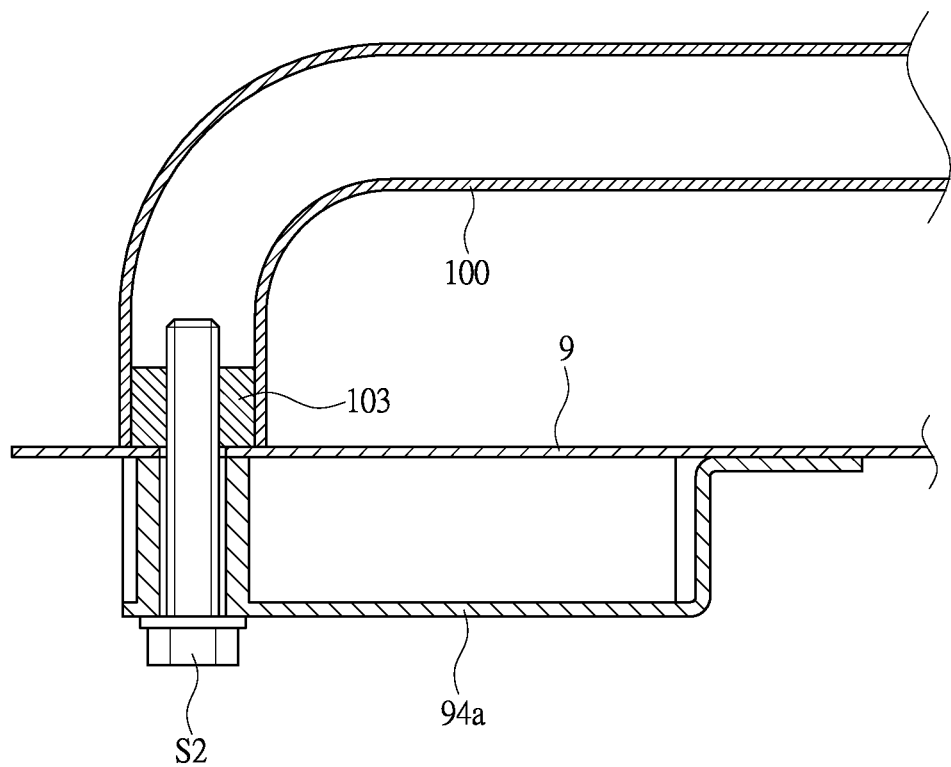

As shown in FIGS. 6 and 7, the present invention provides another example of connection between the rear cargo bed 9 and the restraint bar 100. The rear cargo bed 9 are provided, on three sides thereof, with connection inserting-seats 94a that are arranged on an underside of the rear cargo bed 9 toward a lower side of the vehicle body, and two ends of the restraint bar 100 are each provided a screwing element 103 embedded therein, so that fastening elements S2 may be inserted from a vehicle lower side toward a vehicle upper side to penetrate through the connection inserting-seats 94a and screw into the screwing elements 103 of the restraint bar 100 to make the restraint bar 100 screwed to and positioned on the rear cargo bed 9.

The primary efficacy of the present invention is that the multipurpose vehicle 2 comprises a vehicle frame unit 3, a steering device 4 connected to the vehicle frame unit 3 and operable to control a moving direction of the multipurpose vehicle 2, a front wheel assembly 5 mounted to a front end of the vehicle frame unit 3, a seat portion 6 mounted on the vehicle frame unit 3 to receive a driver and a passenger to sit thereon, a rear wheel assembly 7 mounted to a rear end of the vehicle frame unit 3, and a vehicle cover unit 8 set on and covering a periphery of the vehicle frame unit 3, a rear cargo bed 9 in the form of a flat surface being arranged on a rear frame portion 3a of the vehicle frame unit 3; and as such, the perform of the multipurpose vehicle 2 for carrying cargo is improved.

The second efficacy of the present invention is that the rear frame portion 3a of the vehicle frame unit 3 is provided with connection bases 32 and pivot bases 33, and the rear cargo bed 9 is provided with fixing portions 91 corresponding to the connection bases 32 of the vehicle frame unit 3 and the rear cargo bed 9 is provided with pivoting portions 92 corresponding to the pivot bases 33 of the vehicle frame unit 3; and the rear cargo bed 9 is pivotally connected to the pivot bases 33 of the vehicle frame unit 3 by means of the pivoting portions 92, and the rear cargo bed 9 is mounted to the connection bases 32 of the vehicle frame unit 3 by means of the fixing portions 91; and as such, positioning stability of the rear cargo bed 9 is enhanced.

The third efficacy of the present invention is that the rear cargo bed 9 is provided with a plurality of pairwise-arranged connection inserting-seats 94; and the connection inserting-seats 94 receive a restraint bar 100 to fit, through insertion, thereto; and as such, stability of cargo loading on the rear cargo bed 9 is enhanced.

The fourth efficacy of the present invention is that the restraint bar 100 is provided with a plurality of restrain pegs 101, and the restrain pegs 101 each have an end that is expanded to form a restraining head portion 102; and as such, stability of cargo loading on the rear cargo bed 9 is enhanced.

The fifth efficacy of the present invention is that the restraint bar 100 is mounted, through insertion, to each of a left side, a right side, and a rear side of the rear cargo bed 9; and as such, stability of cargo loading on the rear cargo bed 9 is enhanced.

The sixth efficacy of the present invention is that the rear cargo bed 9 is provided with a plurality of connection fixing-holes 93, and the plurality of connection fixing-holes 93 receive a cargo rack 200 to mount thereto; and the cargo rack 200 is provided with a plurality of connection mounting-bases 201 respectively corresponding to the plurality of connection fixing-holes 93 of the rear cargo bed 9; and as such, universality of the rear cargo bed 9 for cargo loading is enhanced.

The seventh efficacy of the present invention is that the cargo rack 200 is spaced from the rear cargo bed 9 by a predetermined spacing distance; and the spacing distance of the cargo rack 200 from the rear cargo bed 9 is determined by a length of the connection mounting-bases 201; and as such, universality of the rear cargo bed 9 for cargo loading is enhanced.

The eighth efficacy of the present invention is that the restraint bar 100 is mounted, through insertion, to the rear cargo bed 9, such that a top end of the restraint bar 100 is slightly higher than a top end of a rear vehicle body A surrounding three sides of the rear cargo bed 9; and as such, when cargo loaded on the rear cargo bed 9 exceeds a width of the rear cargo bed 9, the cargo is supported on the restraint bar 100 and the cargo is prevented from pressing on the rear vehicle body A surrounding the three sides of the rear cargo bed 9.

The ninth efficacy of the present invention is that the rear cargo bed 9 is provided with connection inserting-seats 94a that are arranged on an underside of the rear cargo bed 9 facing toward a vehicle lower side, and two ends of the restraint bar 100 are each provided with a screwing element 103 embedded therein; and as such, easiness of connecting the rear cargo bed 9 and the restraint bar 100 is enhanced.

The present invention provides a rear cargo bed structure of a multipurpose vehicle that is constructed as described above to effectively achieve the objectives that are sought for, and thus fully meets the requirements for novelty, non-obviousness, and industrial utilization. An application is thus filed, and grating and issuance of a patent is respectfully requested.

I claim:

1. A rear cargo bed structure of a multipurpose vehicle, the multipurpose vehicle comprising a vehicle frame unit, a steering device connected to the vehicle frame unit and operable to control a moving direction of the multipurpose vehicle, a front wheel assembly mounted to a front end of the vehicle frame unit, a seat portion mounted on the vehicle frame unit to receive a driver and a passenger to sit thereon, a rear wheel assembly mounted to a rear end of the vehicle frame unit, and a vehicle cover unit set on and covering a periphery of the vehicle frame unit, wherein a rear cargo bed in the form of a flat surface is arranged on a rear frame portion of the vehicle frame unit; wherein the rear cargo bed is provided with a plurality of pairwise-arranged connection inserting-seats; and the connection inserting-seats receive a restraint bar to fit, through insertion, thereto; and, wherein the restraint bar is provided with a plurality of restrain pegs, and the restrain pegs each have an end that is expanded to form a restraining head portion.

2. The rear cargo bed structure of the multipurpose vehicle according to claim 1, wherein the rear frame portion of the vehicle frame unit is provided with connection bases and pivot bases, and the rear cargo bed is provided with fixing portions corresponding to the connection bases of the vehicle frame unit and the rear cargo bed is provided with pivoting portions corresponding to the pivot bases of the vehicle frame unit; and the rear cargo bed is pivotally connected to the pivot bases of the vehicle frame unit by means of the pivoting portions, and the rear cargo bed is mounted to the connection bases of the vehicle frame unit by means of the fixing portions.

3. The rear cargo bed structure of the multipurpose vehicle according to claim 1, wherein the restraint bar is mounted, through insertion, to each of a left side, a right side, and a rear side of the rear cargo bed.

4. The rear cargo bed structure of the multipurpose vehicle according to claim 1, wherein the rear cargo bed is provided with a plurality of connection fixing-holes, and the plurality of connection fixing-holes receive a cargo rack to mount thereto; and the cargo rack is provided with a plurality of connection mounting-bases respectively corresponding to the plurality of connection fixing-holes of the rear cargo bed.

5. The rear cargo bed structure of the multipurpose vehicle according to claim 4, wherein the cargo rack is spaced from the rear cargo bed by a predetermined spacing distance; and the spacing distance of the cargo rack from the rear cargo bed is determined by a length of the connection mounting-bases.

6. The rear cargo bed structure of the multipurpose vehicle according to claim 1, wherein the restraint bar is mounted, through insertion, to the rear cargo bed, such that a top end of the restraint bar is slightly higher than a top end of a rear vehicle body surrounding three sides of the rear cargo bed.

7. The rear cargo bed structure of the multipurpose vehicle according to claim 1, wherein the rear cargo bed is provided with connection inserting-seats that are arranged on an underside of the rear cargo bed facing toward a vehicle lower side, and two ends of the restraint bar are each provided with a screwing element embedded therein.

8. The rear cargo bed structure of the multipurpose vehicle according to claim 2, wherein the rear cargo bed is provided with a plurality of pairwise-arranged connection inserting-seats; and the connection inserting-seats receive a restraint bar to fit, through insertion, thereto.

9. The rear cargo bed structure of the multipurpose vehicle according to claim 8, wherein the restraint bar is provided with a plurality of restrain pegs, and the restrain pegs each have an end that is expanded to form a restraining head portion.

10. The rear cargo bed structure of the multipurpose vehicle according to claim 8, wherein the restraint bar is mounted, through insertion, to each of a left side, a right side, and a rear side of the rear cargo bed.

11. The rear cargo bed structure of the multipurpose vehicle according to claim 2, wherein the rear cargo bed is provided with a plurality of connection fixing-holes, and the plurality of connection fixing-holes receive a cargo rack to mount thereto; and the cargo rack is provided with a plurality of connection mounting-bases respectively corresponding to the plurality of connection fixing-holes of the rear cargo bed.

12. The rear cargo bed structure of the multipurpose vehicle according to claim 11, wherein the cargo rack is spaced from the rear cargo bed by a predetermined spacing distance; and the spacing distance of the cargo rack from the rear cargo bed is determined by a length of the connection mounting-bases.

13. The rear cargo bed structure of the multipurpose vehicle according to claim 8, wherein the restraint bar is mounted, through insertion, to the rear cargo bed, such that a top end of the restraint bar is slightly higher than a top end of a rear vehicle body surrounding three sides of the rear cargo bed.

14. The rear cargo bed structure of the multipurpose vehicle according to claim 8, wherein the rear cargo bed is provided with connection inserting-seats that are arranged on an underside of the rear cargo bed facing toward a vehicle lower side, and two ends of the restraint bar are each provided with a screwing element embedded therein.

* * * * *